United States Patent [19]

Wille et al.

[11] Patent Number: 5,602,957
[45] Date of Patent: Feb. 11, 1997

[54] PERMANENT MAGNET DIRECT CURRENT MOTOR

[75] Inventors: Guillermo Wille, Hendersonville; Donald B. Pedigo, Gallatin, both of Tenn.; Harald E. Blaettner, Fort Wayne, Ind.; Bernd A. Wieland, Gaggenau, Germany; Eldon R. Cunningham, Fort Wayne, Ind.

[73] Assignee: General Electric Company, Fort Wayne, Ind.

[21] Appl. No.: 77,513

[22] Filed: Jun. 17, 1993

Related U.S. Application Data

[63] Continuation-in-part of Ser. No. 72,579, Jun. 7, 1993, abandoned.

[51] Int. Cl.⁶ .................................................. H02K 13/00
[52] U.S. Cl. .......................... 388/836; 318/439; 318/254; 318/248
[58] Field of Search .................................. 318/138, 254, 318/439, 457, 440–466, 558, 361, 541, 542, 292, 492; 388/820–836; 310/49, 30, 148, 151, 129, 219, 230, 177, 168, 220, 198

[56] References Cited

U.S. PATENT DOCUMENTS

| Re. 32,674 | 5/1988 | Wilson | 318/439 |
|---|---|---|---|
| 3,959,705 | 5/1976 | Salihi | 318/439 |
| 3,983,432 | 9/1976 | Rankin . | |
| 4,119,899 | 10/1978 | Sumida | 318/459 |
| 4,237,410 | 12/1980 | Erickson et al. | 318/376 |
| 4,247,808 | 1/1981 | Hanner | 318/439 |
| 4,305,027 | 12/1981 | Wilson | 318/439 |
| 4,316,186 | 2/1982 | Purdy et al. | 310/245 |
| 4,395,668 | 7/1983 | Komatsu | 318/439 |
| 4,425,536 | 1/1984 | Larsen | 318/439 |
| 4,625,136 | 11/1986 | Kipke . | |
| 4,656,404 | 4/1987 | Klinchurch | 318/558 |
| 5,023,532 | 6/1991 | Gakenholz | 318/541 |
| 5,077,509 | 12/1991 | Wilson | 318/439 |
| 5,113,104 | 5/1992 | Blaettner et al. . | |
| 5,113,113 | 5/1992 | Tepavcevic | 318/701 |
| 5,168,203 | 12/1992 | Tepavcevic | 318/701 |
| 5,293,518 | 3/1994 | Wilson | 318/439 |

FOREIGN PATENT DOCUMENTS

| 0148474 | 7/1985 | European Pat. Off. . |
|---|---|---|
| 3010036 | 10/1981 | Germany . |

*Primary Examiner*—Paul Ip
*Attorney, Agent, or Firm*—Ralph E. Krisher, Jr.

[57] ABSTRACT

Disclosed is an improvement to the stability of D.C. motor brushes mounted in brush boxes with wings is improved by angling the wings toward the commutator such that the brush spring contacts the brush at one or more points intermediate the ends of the brush. Improved cooling is provided by utilizing an end plate with apertures and a brush plate which in combination with the commutator, provides a brush plate aperture for cooling air flow. In a preferred embodiment, speed variations of the motor can be achieved by selectively disconnecting one or more brushes in a four brush embodiment reducing the torque and rotating speed of the motor. In a preferred embodiment, the use of a diode to interconnect same polarity brushes permits a speed change to be accomplished by selectively connecting one or the other end of the diode. In a further preferred embodiment, the stalling of the motor having power applied is indicated by an electronic output where voltage applied to one brush is filtered through an RC filter with the output amplified and voltage doubled. A ripple output indicating that the motor is rotating after amplification will light a light emitting diode indicating proper operation of the motor.

11 Claims, 8 Drawing Sheets

FIG_1

FIG_2

FIG_3A
PRIOR ART

FIG_3B

FIG_3C

FIG_5

FIG_6

FIG_7

FIG_10

PERMANENT MAGNET DIRECT CURRENT MOTOR

This application is a continuation-in-part of Ser. No. 08/072,579 filed Jun. 7, 1993, now abandoned.

TECHNICAL FIELD

The present invention relates generally to improvements in electric motors and specifically to improvements in direct current permanent magnet motors utilizing a brush/commutator current transfer system.

BACKGROUND

Direct current permanent magnet electric motors are widely used in many applications. Recently there has been a trend towards increased usage of such motors in order to meet automotive engine cooling system requirements. Such motors are advantageous in that, for normal cruising speeds, the flow of air through an automotive radiator is sufficient, without the fan motor being operated, for adequate cooling of the engine. However, occasional traffic situations require minimal operation of the cooling fan at less than full speed, while extremely hot days or high heat load (such as when the air conditioner is in operation) full speed fan operation is necessary to provide sufficient engine cooling. Thus, in the automotive environment, multiple speed fans are desirable.

A multiple speed automotive fan is shown in U.S. Pat. No. 5,113,104 entitled "Structured Product Dynamoelectric Machine" issued to Blaettner et al. on May 12, 1992, said patent herein incorporated by reference.

Permanent magnet DC motors utilize two or more brushes contacting a commutator which provides the direct current flow to the windings of the rotor, which in turn provide the desired magnetic repulsion/attraction with the permanent magnets located around the periphery of the motor. The brushes are conventionally located in brush boxes and utilize a U-shaped spring which biases the brush into contact with the commutator. Because such springs generally contact the brush at only two points (at the rear of the brush), the stability of the brush and accuracy of its positioning with respect to the commutator is adversely affected. The brushes can move from side to side in the brush box resulting in movement of the brush relative to the commutator and bouncing of the brush so as to interrupt contact with one or more commutator segments during operation of the motor. This resulting interruption in current flow to the motor can result in arcing at the brush/commutator interface and overheating of the brush, as well as decreased current flow to the motor and a resultant decrease in motor output and increase in motor noise.

Prior art fan motors, especially those utilized in the automotive environment, have a difficult task in keeping the fan motor itself cool while performing its engine cooling task. It has been found that the brush/commutator interface is the second most significant source of generated heat in a DC brush motor. Without effective cooling in this area, there are higher thermally induced resistance losses and decreased brush life due to higher operating temperatures along with thermal aging effects. If brushes are left exposed to the environment, in order to promote cooling of the brushes, they can become contaminated by dirt, water, oil and other contaminants present in the automotive environment. It is desirable to cool the brushes without exposing them to contaminants.

It is desirable to be able to control the output speed of automotive DC brush motors (full speed and less than full speed). This is normally accomplished by the use of external means i.e., electronic controllers or power resistors or internal means i.e., separate windings and commutators and extra brushes. Where electronic controllers are utilized, complex electronic circuitry is necessary to provide the desired voltage and current which will result in the desired output speed change of the motor necessitating increased cost of the overall component.

If internal or external power resistors are used, such resistors are included in the motor energization circuit with the result that the resistor dissipates a substantial portion of the power (in the form of heat) which would otherwise be applied to the motor thus wasting battery energy and increasing motor temperature. Where internal means, such as extra brushes, windings and commutators are used, a number of components and elements in a motor are increased generally by a factor of 2, where a separate operating speed is necessary, again complicating the manufacturing process and raising the ultimate cost of the motor.

Of concern to automotive component designers and, in particular, automotive DC motor designers, is the compatibility of their products with existing automotive wiring systems. It is desirable to be able to obtain variations in fan operating speed by applying a fixed system voltage (battery voltage) to one terminal for high speed operation and another terminal for low speed operation, rather than having to incorporate a switch or electronic relay or a variable voltage supply system to obtain multi-speed operation.

Furthermore, there are situations in which the motors are prevented from rotation i.e., a stalled condition (this can result from snow packing of the fan, minor crash damage, etc.). If the motor is energized during the stalled condition, the relatively high current load, without sufficient cooling air, can overheat the wiring resulting in a fire in the engine compartment. While most direct current electric motors in automotive applications can be protected by means of fuses or of thermoswitches, such protection is not feasible for under-the-hood applications because of the extremely wide temperature range required in this environment.

Moreover, the operation of a permanent magnet direct current motor creates radio frequency interference (RFI) as a result of the connection and disconnection of electric current with the rotor windings in the brush/commutator interface. While this cannot be eliminated, it is desirable to reduce RFI as much as possible, especially in automotive applications.

DISCLOSE OF THE INVENTION

It is an object of the present invention to provide an improvement to the stability of the brush/spring combination in a direct current motor.

It is an object of the present invention to provide a DC motor cooling system for improving cooling in the region of the brush/commutator interface while preventing direct access to the interface by contaminants present in the environment.

It is a still further object of the present invention to provide a method of achieving multiple speeds in a DC brush motor without the need for electronic controllers, power resistors or extra brushes, windings or commutators in an efficient and cost-effective manner.

It is an additional object of the present invention to be able to select the operating speed of a multi-speed DC motor which utilizes brush disconnection to achieve lower speed operation without electronic switching and by applying full system voltage to different terminals.

It is a still further object of the present invention to provide a sensor capable of indicating that a DC electric motor is in fact rotating if it has been energized.

It is an additional object of the present invention to reduce as much as possible the generation of radio frequency interference created by operation of the motor.

In accordance with the present invention, the above and other objects are achieved by increasing the number of contact points between the brush spring and the brush and by moving the location of those contact points closer to the brush/commutator interface. One or more of the brush box wings, upon which the U-shaped spring tension coils bear, are positioned at a less than 90° angle with respect to the direction of movement of the brush, so as to bias the coil portion of the spring into contact with the brush at a position intermediate the ends of the brush. In a preferred embodiment, both brush box wings are so positioned.

The above and other objects are achieved in accordance with the present invention by providing a motor case end shield with a plurality of apertures disposed outward from the rotational axis of the motor so as to shield the brushes from direct contact with contaminants. Inside the motor case, the brush plate, which mounts the brushes, provides only a narrow slot between the inner periphery of the brush plate and the commutator, thereby forcing cooling air, passing through the motor case, to pass directly over the commutator and brush/commutator interface. Air in the motor case is then withdrawn by a low pressure area caused by radial spokes on the front motor hub acting in the manner of a centrifugal pump.

The above and other objects are achieved in accordance with the present invention by disconnecting one or more brushes in a four brush DC motor. Because the brushes provide connections to the rotor coils, the disconnection of one brush simply means that the current from the other brushes must travel a much greater path in the rotor coil encountering higher internal resistance and thus lowering the overall current flow. In a preferred embodiment, one or two brushes can be disconnected providing a medium and a low speed operational capability, respectively.

The above and other objects are also achieved in accordance with the present invention by providing a diode between two identical plurality brushes. The diode permits both brushes to be energized when one side of the diode is provided with system power but prevents one brush from receiving system power when the other side of the diode is energized. Depending upon which side of the diode is supplied with full system power, high speed or low speed operation is achieved.

The above and other objects are additionally achieved by the provision of a DC motor rotation indicator. During rotation of a direct current motor, a ripple in the current travelling through the motor is created as long as the motor is running. If the motor is stalled and energized, there is no ripple in the current flow through the motor. With the aid of an RC filter, the ripple component flow, through one of the brushes of the motor, can be filtered out and amplified. If this output is rectified, the resultant signal indicates that the motor is energized and running and can be used to drive a light emitting diode to so indicate. The absence of a signal when the motor is energized is an indication that the motor is stalled.

The above and other objects are achieved by the use of ferrite core choke coils connected between each of the brushes and the respective current bus bar with the shortest electrical connection possible, the location of the bus bars adjacent and parallel with each other, the bridging of the bus bars by a radio frequency capacitor and the location of each choke coil orthogonal to the operating direction of a respective brush.

BRIEF DESCRIPTION OF THE DRAWINGS

The invention will be better understood by reference of the following drawings wherein.

BEST MODE FOR CARRYING OUT THE INVENTION

Similar elements are similarly designated by reference numerals in the individual drawings. For an overall understanding of applicants' invention, attention is first directed to FIG. 1 which generally illustrates a preferred embodiment of the improved compact direct current motor 10.

Figures 1, 2:
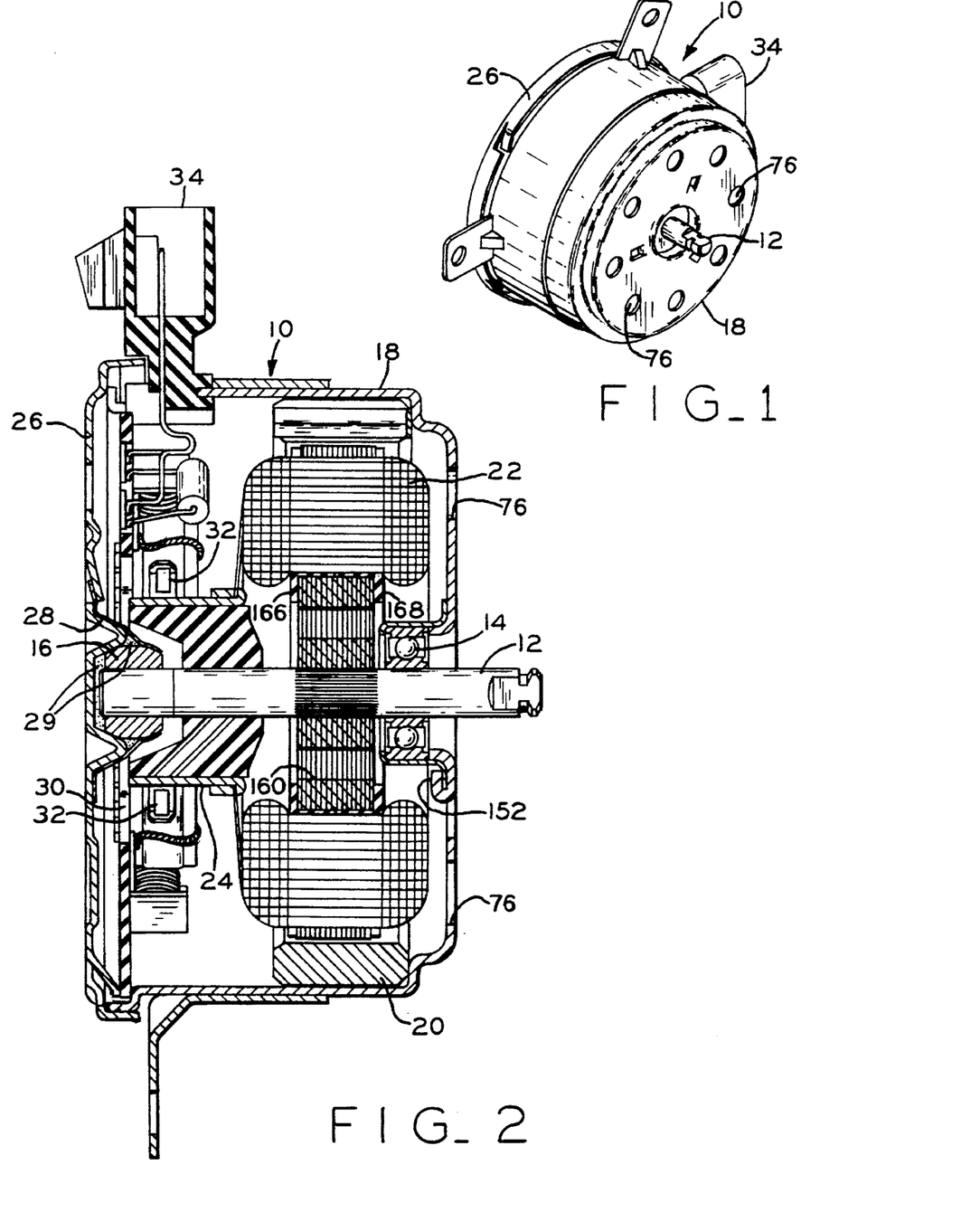
FIG. 1 is a front prospective view of a preferred embodiment of the present invention.
FIG. 2 is a cross sectional view of the present invention shown in FIG. 1.

FIG. 2 is a cross sectional view of the motor without its associated front hub (to which a cooling fan may may be usefully connected) illustrating the internal orientation of the components. An output shaft 12 is mounted for rotation in front ball bearings 14 and rear sleeve bearing 16. The motor case 18 serves to mount the permanent magnets 20 around the periphery of rotor 22 which, in turn, is mounted for rotation on output shaft 12. The rotor 22 includes coils which are electrically connected to the commutator 24. The end shield 26 is fixed to the motor case 18 and retains the rear sintered sleeve bearing 16 in a bearing attachment cup 28. In a preferred embodiment the space between the bearing, the attachment cup 28 and the end shield 26 has an oil retaining material 29 (such as PERMAWICK™ available from Permawick Corporation) for providing an oil retention reservoir for the porous sleeve bearing.

Brush Mounting

Figure 3A:
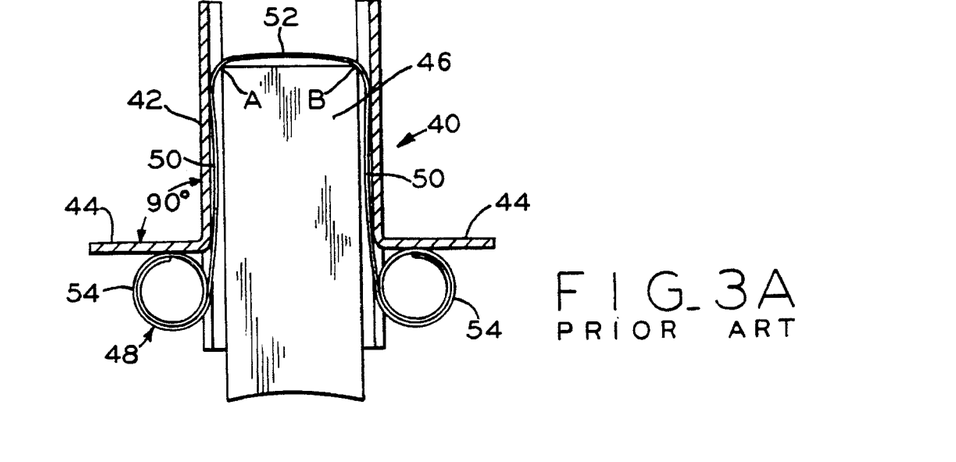
FIG. 3A is a side view of prior art brush/spring combination.
Figure 3B:
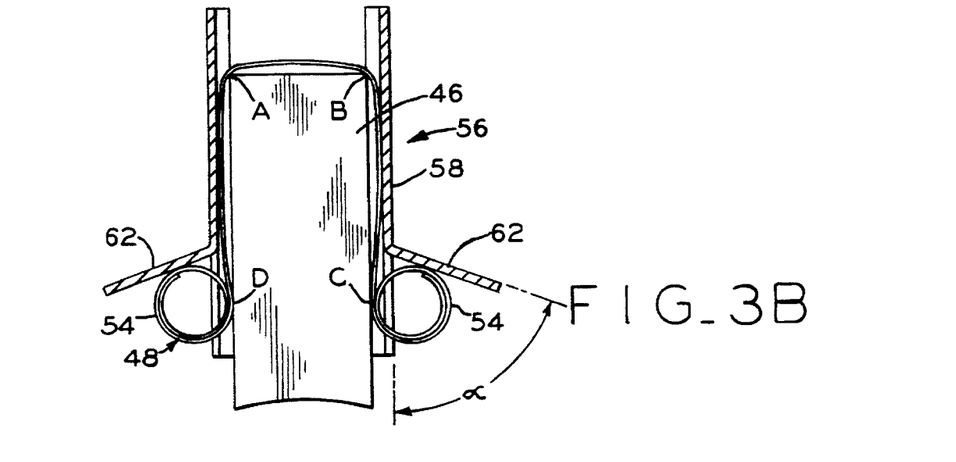
FIGS. 3B and 3C are side views of improvements in the brush/spring combination in accordance with the present invention.
Figure 3C:
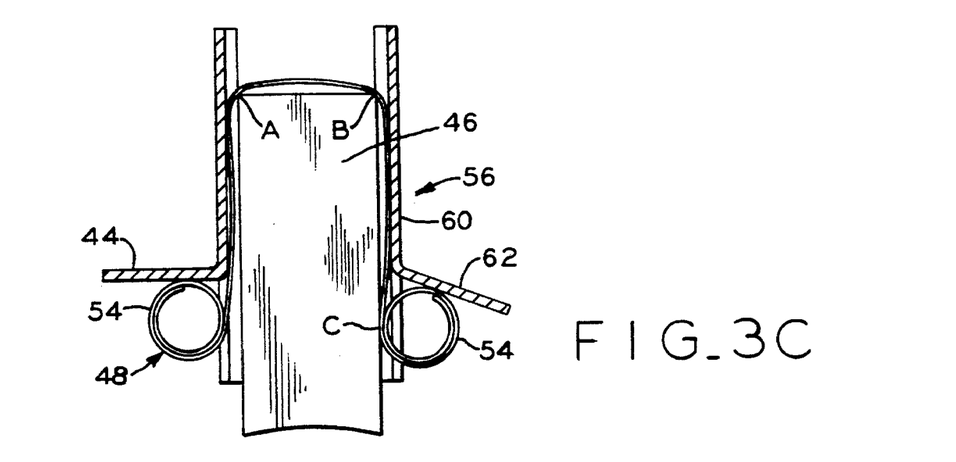

Brush plate 30 serves to mount the brushes 32 which can be seen in greater detail in FIGS. 3A through 3C. The brush plate also mounts the other electronic components and provides electrical connection with output connection terminal 34 which, in an automotive application, is plugged into the automobile's wiring harness.

FIG. 3A illustrates a conventional brush/spring combination 40 in which brush box 42 includes wings 44 which extend perpendicular to the direction that brush 46 moves and is biased by spring 48. The spring is a generally U-shaped spring having two extending portions 50 connected by a traverse portion 52. At the ends of the extending portions 50, away from the transverse portion 52, there are spring coils 54 which bear on wings 44 to bias the brush 46 towards the commutator (not shown).

It can be seen in FIG. 3A that spring 48 contacts the brush only a points A and B and these points are at the end of the brush which is away from the commutator. It is remembered that the commutator is rotating in the plane of the figure and, consequently, the portion of the brush in contact with the commutator is urged to the left under the influence of commutator friction. Because the brush 46 is a loose fit in the brush box 42, it has some room for movement which leads to the noted problems in the prior art of brush vibration, intermittent connection, arcing and increased wear.

FIGS. 3B and 3C illustrate the improved brush/spring combination 56. While the brush 46 and the brush spring 48 are the same elements in FIG. 3A, the brush box 58 in the FIG. 3B and brush box 60 in FIG. 3C is different. Brush box 58 includes two angled wings whereas brush box 60 includes only a single angled wing. Because coils 54 bear against the wing, if the wing is angled, the bias vector will also be angled. Because the prior art wings 44 in FIG. 3A are perpendicular to the bias direction of the brush, the bias vector is parallel to the bias direction of the brush.

However, in the case of angled wings 62, the bias vector is inclined which forces the spring coils 54 into contact with the brush at additional points C and D. These contact points are in addition to the previously discussed contact points A and B. It is noted that contact points C and D are intermediate the ends of the brush and are much closer to the commutator. In FIG. 3B, because both wings 62 are angled, there are two additional contact points. In FIG. 3C only one wing is angled and thus there is only one additional contact point. These additional contact points, especially since they are closer to the commutator/brush interface, provide a substantial increase in stability for the brush, reducing movement of the brush due to friction of the commutator thereby improving motor operation and reducing brush induced noise.

FIG. 3B illustrates that angle α is an acute angle less than 90°. In a preferred embodiment, these angles are between 85° and 55° and, in a preferred embodiment, the angle is 75°. The embodiments of a single deformed wing of FIG. 3C and the two deformed wings of FIG. 3B provide additional points of stability in a brush/spring combination and result in a longer wearing brush and a smoother and quieter running motor.

FIG. 3B shows a preferred embodiment of the means for increasing the lateral stability of the brush relative to the commutator. In this embodiment, lateral vibration of the brush, in order to change the brush's position, must overcome the substantial frictional resistance of moving the coils of the spring (that are near the commutator end of the brush) over the surface of the angled tabs or wings 62. This frictional resistance to lateral movement of the brush is not available in the prior art brush shown in FIG. 3A because the coils do not contact the brush and the brush can vibrate laterally without encountering any resistance to lateral movement.

Increased Motor Cooling

Figure 4A:
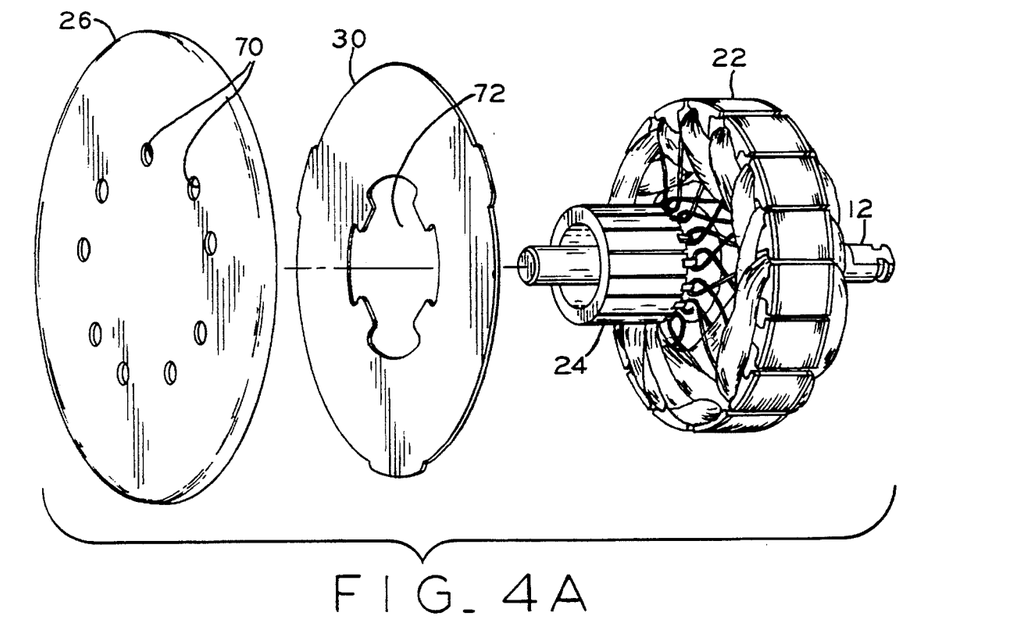
FIG. 4A is an exploded view of the end shield, brush plate and commutator/rotor components in accordance with the present invention.
Figure 4B:
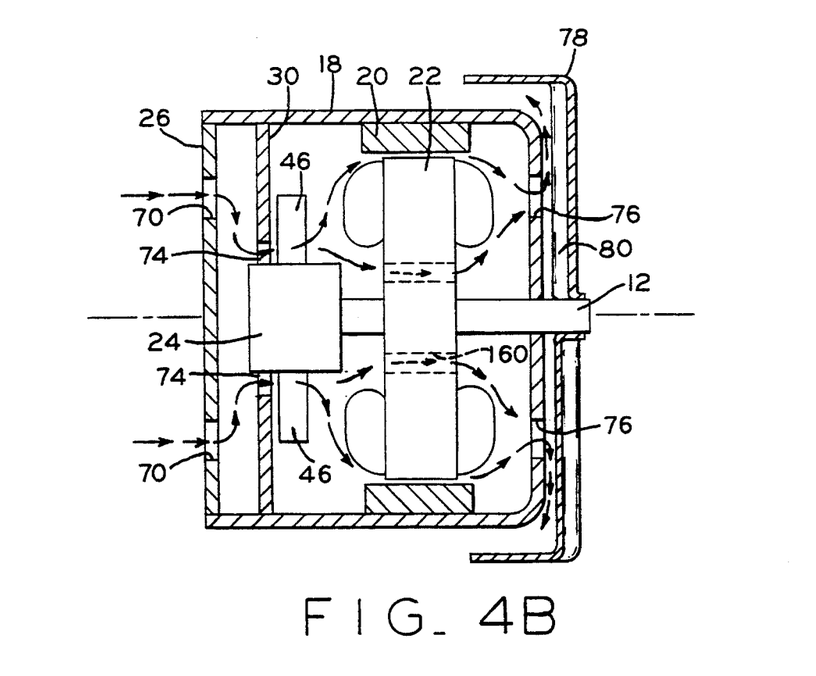
FIG. 4B is a side cross sectional view illustrating air flow through and around the components of FIG. 4A.

The improvements to the compact fan motor 10 which contribute to its cooler, more reliable operation can be seen by reference to FIGS. 4A and 4B. The rear of the motor case 18 is closed by end shield 26 as shown in FIG. 4B. The end shield has a plurality of apertures 70 which permit cooling air to flow into the interior of the motor case 18 as shown by the arrows passing through apertures 70. However, since it is undesirable to have direct access to the brush/commutator interface, the apertures 70 are spaced a radially outward distance from the axis of rotation of the output shaft as shown.

The brush plate 30 is fitted inside the motor case 18. The central aperture 72 provides sufficient clearance for commutator 24, and, in combination with the commutator 24, provides a brush plate aperture 74 through which cooling air can pass (as shown by the arrows). The brush plate aperture 74 extends around the commutator so as to permit air to flow pass the commutator and in particular past the brush/commutator interface. This serves to reduce thermal induced resistance losses and increased brush life due to the lower operating temperatures and reduced thermal aging effects at the brushes.

It should be noted that the brush plate aperture 74 is located substantially closer to the axis of rotation of the output shaft thereby preventing direct access to the brush/commutator interface by outside contaminants. An end view of FIG. 4B would show that the brush plate aperture 74 is not visible in the end shield apertures 70 and thus these two apertures are not axially coincident.

Alternatively, it would be possible to locate a central aperture along the axis of rotation which is also not coincident with the brush plate aperture so as to supply cooling air to the brush plate aperture. However, some other arrangement with respect to mounting sleeve bearing 16 would be required and thus a central aperture would not be a preferred embodiment of the present invention.

In a further preferred embodiment of the present invention, the total area of the end shield apertures 70 is greater than the area of the brush plate aperture 74 and, given the same cooling air mass flow rate through the motor case, the flow velocity through the brush plate aperture 74 would be higher than the flow velocity through the end shield apertures 70, thereby promoting increased heat transfer and local cooling of the brushes and commutator.

After having cooled the brushes and commutator, as shown by the arrows in FIG. 4B, the cooling air passes around the rotor 22 and exits the motor case through front apertures 76. The air exiting the case is drawn into a low pressure area, between the motor case and the front hub 78, created by the centrifugal action of stiffening ribs 80 located on the inner surface of the front hub 78. While in a preferred embodiment, these stiffening ribs are merely stamped into the front hub 78, they could be provided in any fashion. While in a preferred embodiment, they are simply straight radial ribs extending outward from the shaft to the outer periphery of the front hub, for improved pumping efficiency they could be of a spiral shape.

As is conventional with centrifugal pumps, rotation of the front hub and therefore rotation of the air adjacent the hub (by means of stiffening ribs 80), the air is thrown toward the outer periphery of the hub creating a low pressure area in the vicinity of the front apertures 76. This low pressure tends to draw air out of the motor case 18 and thus additional air is drawn in through apertures 70 in the end shield and past the brushes and commutator through the brush plate aperture 74.

In accordance with the present invention, it is seen that while contaminants are prevented from reaching the brush/commutator interface, cooling air is provided a path 18 through the motor case. It is drawn through the motor case by the creation of a front low pressure region and air flow velocity in the vicinity of the brushes and brush/commutator interface is increased so as to provide greater cooling. The cumulative result of these cooling improvements are a DC motor with a higher reliability and a longer operational life.

Multi-Speed Operation

Figure 5:
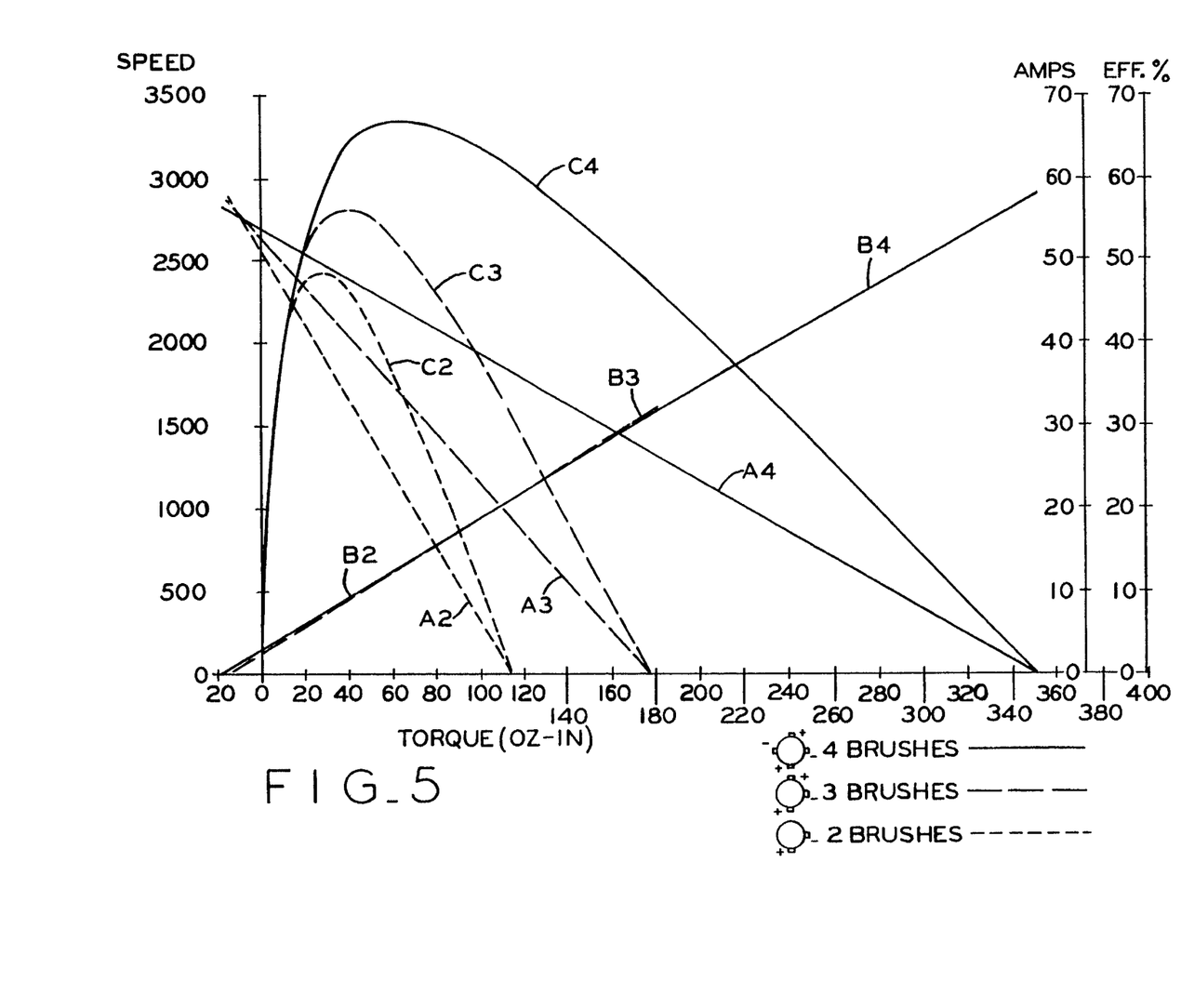
FIG. 5 is a graph of engine speed versus torque, current flow versus torque and efficiency versus torque for a preferred embodiment of the present invention operating in the full, medium and low speed operational ranges.

FIG. 5 illustrates a further aspect of the present invention. Applicants have found that in order to reduce the operating speed of a multi-brush motor (one having more than 2n brushes where n is a positive integer) the disabling or the preventing of current flow through one brush is effective. The disconnection of one or more brushes increases the effective internal coil resistance in the rotor, reducing the current flow through the rotor windings and reducing the speed and torque produced by the motor without the need for varying the system voltage applied to the motor or interconnecting internal or external resistances or different sets of brushes and coil windings.

In the legend associated with FIG. 5, it can be seen that the speed/torque curves A4, the current/torque curves B4 and the efficiency/torque curves C4 associated with all four brushes energized in a four brush DC motor are indicated by the solid line. The curves where one of the four brushes has been disabled (disconnected or otherwise inhibited from passing current) are shown in the dashed line speed/torque curve A3, current/torque curve B3 and efficiency/torque curve C3. The two brush embodiment (where two brushes are disabled) corresponding curves are shown in dotted line speed/torque curve A2, current/torque curve B2 and efficiency/torque curve C2. Motor speed is illustrated in RPM, current in amps, torque in ounce-inches, and efficiency in percent (efficiency is the output energy divided by the input energy i.e., RPM times torque converted to watts divided by input current times voltage).

Figure 6:
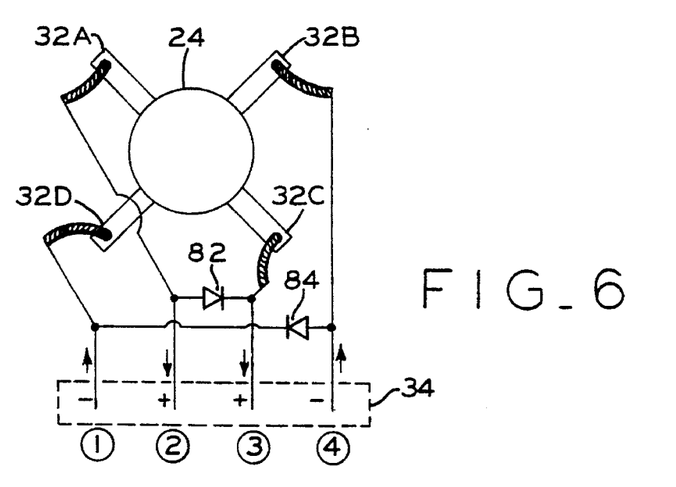
FIG. 6 represents the diode interconnection of brushes in accordance with a further embodiment of the present invention.

In order to implement a disconnected brush (one or two) embodiment, the interconnection between positive and negative terminals as shown in FIG. 6 would be made except that diodes 82 and 84 would not be utilized. If all four brushes were to be energized, the positive and negative terminals (1–4) in connector 34 would be connected to full system voltage as indicated. In many automotive systems a negative ground is used and thus the positive leads would be connected to the positive side of the battery terminal and the negative leads would be connected through ground to the negative terminal of the battery.

If one brush was to be disabled (whether a positive brush 32(a) or 32(c) or a negative brush 32(b) or 32(d)), the power to that portion of the terminal 34 would be interrupted. Thus, in the preferred embodiment, the speed of the DC motor is lessened without the need to dissipate current through an external resistor. This reduced speed will result in a lowered motor current draw.

It can also be seen that deleting two brushes further increases the speed reduction and, subsequently, further reduces the current draw of the motor. In FIG. 5, with a negative brush interrupted (although the same effect would be true for the interruption of a single positive brush), the speed available to drive the fan drops substantially, and the amperage utilized by the motor to drive the fan also drops. The current is linearly related to the torque developed by the motor and it is noted that the lines (B2, B3 and B4) for the three different configurations are essentially colinear.

While any single brush can be disconnected to affect the first level of engine reduction (for example "medium" speed operation) where the second level of speed reduction ("low" speed operation) requires that two adjacent brushes be disabled. This is necessary because the brushes alternate in polarity around the periphery of the commutator and, in a four brush motor, the disabling of two brushes of like plurality would completely prevent current flow in the motor thereby preventing operation.

Therefore, in accordance with this embodiment of the present invention, medium and/or low speed operation can be obtained by disconnecting one or two brushes from the system voltage. The only requirement would be that the power applied to connector 34 must be selectively applied to at least two of the terminals so as to selectively disable one or two brushes depending upon whether "medium" or "low" speed has been selected.

Diode Control of Multi-Speed

As noted above, it is also desirable that the control of a DC motor be compatible with existing automotive connector systems. Prior systems utilizing separate internal brushes and brush/winding systems generally have two different connectors which are separately energized with full system voltage in order to enable either full speed operation or reduced speed operation. Such a system would not be compatible with the FIG. 5 system in which full or part speed operation can be chosen by applying full voltage to differing terminals (for full speed it would have to be applied to all four terminals and for part speed one or two terminals would have to be de-energized or disconnected from the system power).

The utilization of brush diodes 82 and 84 (which are diodes capable of handling the current load of at least a single brush of the motor and, in a preferred embodiment, are available from Bosch GmbH of Germany as part 0-270-100-508-069) as illustrated in FIG. 6 solve this problem. Because a diode permits direct current flow in one direction only, if the two left terminals (numbers 1 and 2) were connected to battery terminals as indicated, current flow would be through terminal 1 into the commutator through negative brush 32(d) and, by way of current flow through diode 84, through negative terminal 32(b). Current would flow out of the commutator through positive brush 32(a) and positive brush 32(c) through diode 82 and out terminal number 2. So the connection of terminals 1 and 2 to system voltage would provide full speed operation.

Interconnecting terminals 1 and 3, with full system voltage, would permit current flow into commutator 24 through negative brushes 32(b) and 32(d) as noted above. However, current flow out of the commutator 24 would be only by way of brush 32(c) because current flow from brush 32(a) to terminal 3 would be blocked by diode 82 (current cannot flow in the direction of the arrow designating a diode). Thus, brush 32(a) is effectively disconnected from operation resulting in the three brush current curves noted in FIG. 5.

Similarly, if terminals 2 and 4 are connected, current can flow into the commutator 24 only through brush 32(b) and not through brush 32(d) (due to the blocking effect of diode 84) although current can flow out of the commutator through brushes 32(a) and 32(c) directly to terminal 2. Thus, the connection of terminals 2 and 4 would also result in three brush operation as discussed in above.

The connection of terminals 3 and 4 to the appropriate battery terminals will result in current flowing from terminal 4 into the commutator 24 only through brush 32(b) (due to the blocking action of diode 84) and only out of the commutator by brush 32(c) (due to the blocking action of diode 82) to terminal 3. Thus, the connection of terminals 3 and 4 result in the two brush torque and power situation shown in FIG. 5. Importantly, the connection of terminals (by electronically choosing between connections of any pair of terminals 1–4), will result in full, medium or low speed operation in a four brush DC motor.

Motor Stall Indication

Figure 7:
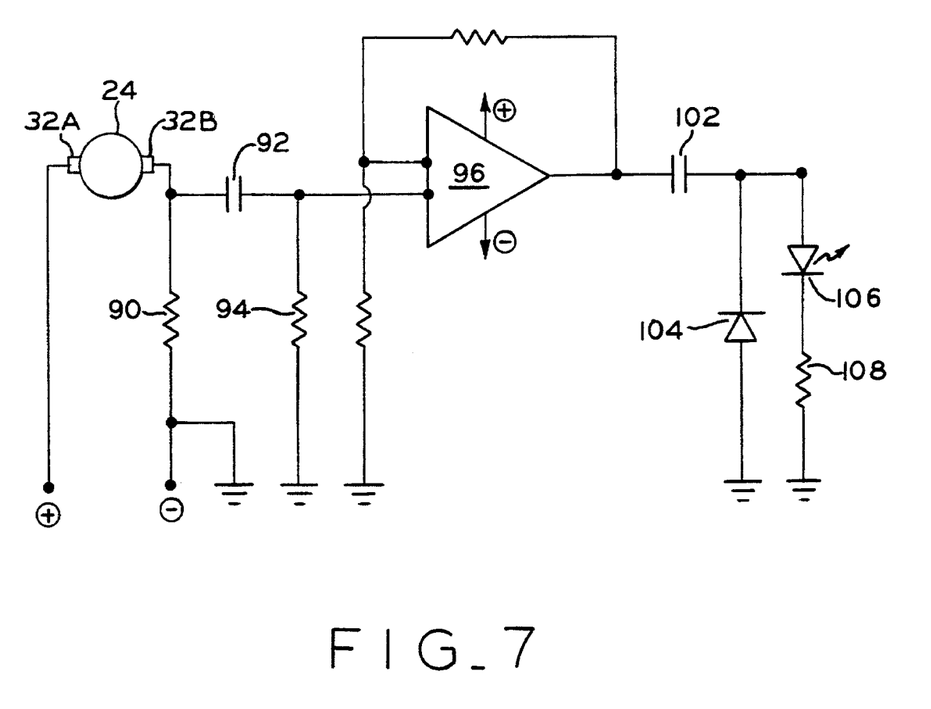
FIG. 7 is an electronic circuit diagram of the DC motor rotation sensor in accordance with the present invention.

FIG. 7 illustrates an electronic circuit for providing an electrical output indicative of the fact that the DC electric motor is either rotating or stalled when energized. A pair of brushes, which are energized with opposite plurality, 32(a) and 32(b), are illustrated in a two brush motor configuration, although if a four brush motor such as FIG. 6 were used, the brushes would be spaced 90° apart instead of 180° apart.

When the motor is energized and rotating, a DC current flows through the motor with an AC ripple impressed thereon. Resistor 90 can either be a small voltage dropping resistor or can be the line resistance in the brush circuit. Variations in current flow through the resistor will provide a varying voltage to one plate of capacitor 92 which, in combination with resistor 94, forms an RC filter for passing the AC component but blocking the DC component of the brush current.

The AC component is amplified in the amplifier circuit comprising operational amplifier 96 and resistors 98 and 100. The amplified output is applied to capacitor 102 and diode 104 which, together, comprise a voltage doubler. The ripple component is thus amplified and voltage doubled and applied to light emitting diode 106 through current limiting resistor 108 to ground.

Therefore, in this particular embodiment, as long as the motor has power applied to it and is rotating, a ripple frequency will be generated which, after amplification and voltage doubling, is sufficient to cause light emitting diode 106 to emit visible light. However, if the motor stalls, even though it still has power applied through the brushes, there will be no AC component and there will be no amplified AC component nor will there be any voltage doubled component, with a consequence that the light emitting diode will not be illuminated. Obviously, the output of the RC filter could be utilized if a nonamplified electrical indication is useful. Similarly, the output of the amplifier or the voltage doubled output could be utilized to provide an indication that the motor is operating properly and, thus the absence of an indication is itself an indication that the motor is stalled.

Figures 8A, 8B:
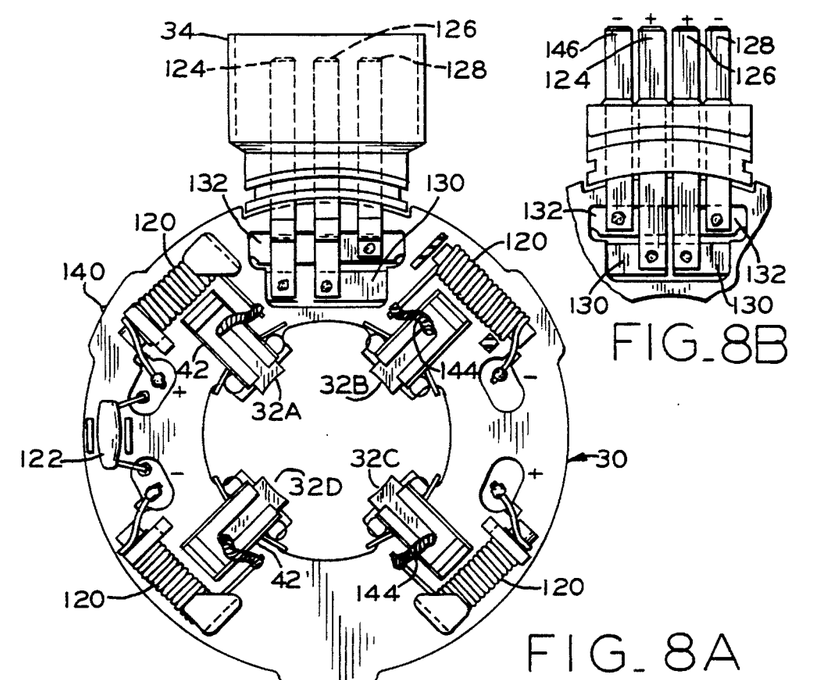
FIG. 8A is front view of the brush plate with terminal connector in accordance with the present invention.
FIG. 8B is a four pin alternative embodiment of the terminal connector of FIG. 8A.
Figure 9:
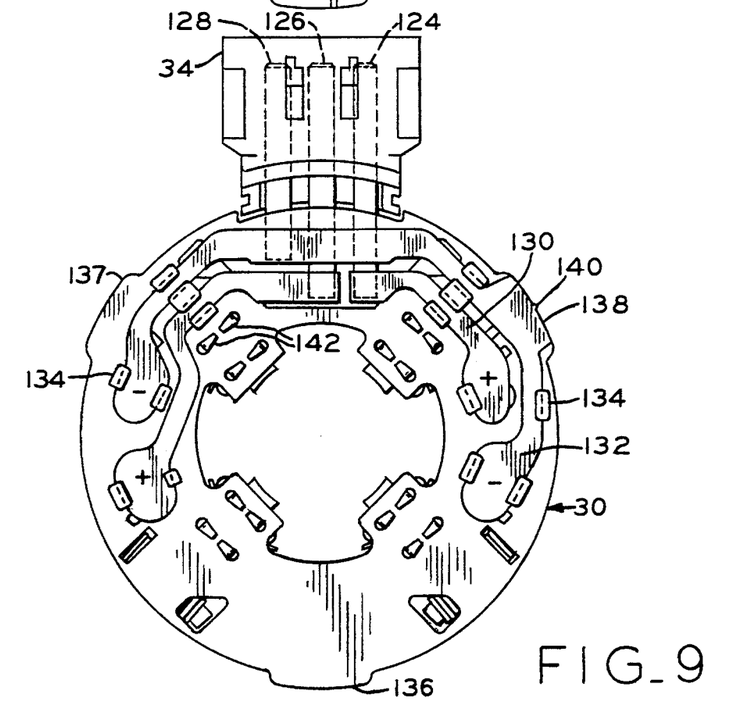
FIG. 9 is a rear view of the brush plate shown in FIG. 8A modified for diode connection.

FIG. 8A shows the brush plate 30 with a preferred embodiment of the connection terminal 34. The location of brushes 32(a)–32(d) are shown as discussed with reference to FIG. 6 except that diodes 82 and 84 have not been inserted. The brush plate 30 also includes brass bus bars for connecting the brushes to the connection terminal (positive bus bar 130 electrically connected to positive strips 124 and 126 and negative bus bar 132 connected to negative strip 128). FIG. 9 is a rear view of the brush plate of FIG. 8A with the exception that it has been modified by cutting of the positive bus bar 130 to permit the inclusion of a single diode 82 (as discussed with reference to FIG. 6 and further discussed in detail later).

Reduced Radio Frequency Interference

Also in FIG. 8A there is illustrated the inclusion of choke coils 120 connected between each of the brushes and their respective positive or negative terminal connections. Also bridging the positive and negative connections for brushes 32(a) and 32(d) is a capacitor (condenser) 122 which, in combination with the choke coils, suppresses radio frequency interference (RFI) during operation of the motor.

Applicants have found that, by locating the RFI suppression choke coils 120 as shown in FIG. 8A, a significant decrease in radio frequency interference can be obtained. The conventional location of such coils would be in a direction parallel with the axis of rotation of the motor and located at a different axial position than the brush itself (resulting in a substantially thicker brush plate). The location immediately above the end of the brush box 42 results in shorter electrical connections from the brush pigtail 144 and the respective bus bar to the coil 120 (as well as a thinner brush plate assembly). The short distance between the brush and the choke coil serves to reduce the RFI.

Additionally, the fact that the positive and negative brush bars are essentially parallel and have equal and opposite current flows further serves to cancel out electromagnetic fields generated by the pulsating direct current through the bus bars which is at least a partial cause of RFI. The various factors shown in FIGS. 8A and 9 which lead to reduce RFI have resulted in prototype motors which all have an RFI DIN (Deutsch International Norm) numbers of at least level 4 and some at level 5 (the higher the level the better and level 5 being the highest level of RFI suppression measured).

Brush plate 30, in a preferred embodiment, is made of a plastic available from General Electric under the name "Valox 9230." The plastic is injection molded with the appropriate channels such that positive and negative bus bars 130 and 132, respectively, reside in those channels and are substantially flush with the rear surface of the brush plate. A number of plastic tabs 134 extend upwardly away from the surface of the brush plate and immediately adjacent the channels in which the bus bars are located. During manufacture of the brush plate, after the bus bars have been located in their respective channels, the tabs are "heat-staked" or heated until they can be plastically deformed so as to prevent removal of the bus bars from their respective channels. The brush boxes 42 are secured to the brush plate 30 by tabs 142 which extend through the brush plate and are then bent over to secure the brush box to the plate.

It will be noted that the brush plate 30 has three radially extending protrusions 136, 137 and 138 which serve to locate the brush plate in the motor case 18. Protrusion 138 includes a portion of negative bus bar 132 which has a brass spike 140 extending 0.020–0.025 inches radially outward beyond the protrusion 138. It can be seen that when the brush plate is assembled in the motor case, spike 140 will form a good electrical connection between negative bus bar 132 and the motor case so as to insure that the motor is properly grounded. Conventional automotive electric motors utilize a negative ground as shown. However, the positive bus bar 130 could be extended with a similar spike such that, in combination with protrusion 136, a positive ground connection could be established.

While terminal 34 in FIG. 8A is shown without any modifications to the positive bus bar 130, in FIG. 9 the positive bus bar 130 is cut between the connection of terminal strips 124 and 126 to permit multi-speed operation. These terminal strips could either be separately energized with a positive voltage supply should be desirable to run a three brush embodiment as shown in FIG. 5 rather than a 4 brush embodiment. Similarly, a diode 82 could be connected to bridge the two positive terminal strips 124 and 126 as shown and discussed in FIG. 6. This would provide two levels of motor speed operation depending upon which way the diode was oriented and which of the two positive strips were energized.

FIG. 8B shows an alternative construction of the terminal and the respective conductive strips to provide the four electrical connections shown in FIG. 6. Both the positive bus bar 130 and the negative bus bar 132 are split so as to permit the installation of a positive diode 82 and a negative diode 84 permitting operation of the FIG. 8A device in the manner discussed in association with FIG. 6 i.e., three separate speeds of operation depending upon whether four, three or two brushes remain energized. In the event diodes 82 and 84 are to be included on brush plate 30 shown in FIG. 8A (where one or both of the bus bars are severed as shown in FIGS. 9 and 8B, respectively), they would be located over the connection between the terminal strips and their respective bus bars bridging the gap between the right and left sides of their respective bus bars.

Figure 10:
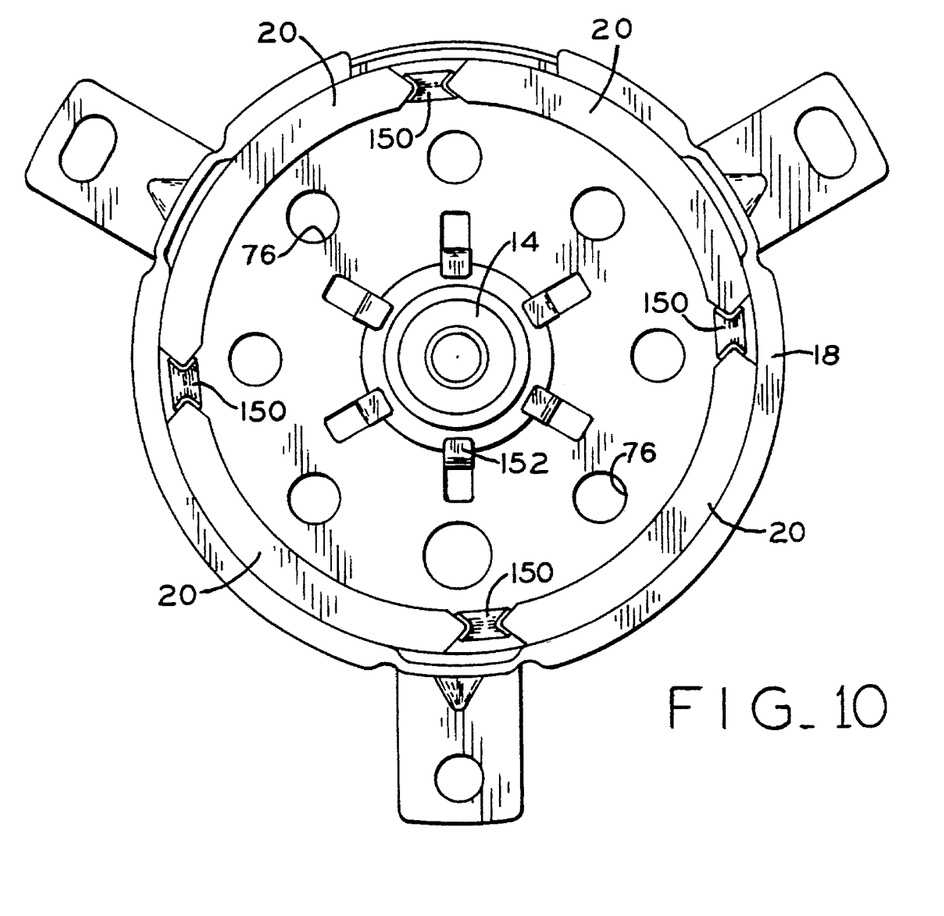
FIG. 10 is a front view of the motor case showing metal clips which in combination with adhesive serve to retain the permanent magnets.

FIG. 10 illustrates the location of permanent magnets 20 in the motor case 18 which in a preferred embodiment may be bonded into the internal periphery of the case. Temporary locating clips 150 comprise a single U-shaped piece of spring steel with the arms grooved so that they bias the ends of the magnets away from each other. This bias in turn forces the magnets radially outward into intimate contact with the motor case 18. While the clips are primarily useful in the initial location of the magnets in position while the adhesive bonding material cures, they also provide a back-up which will continue to locate a magnet should its adhesive material fail. This back-up permanent magnet retention feature serves to increase the reliability and durability of the compact fan motor.

The details of the mounting of front ball bearing 14 in the motor case 18 are also shown in FIG. 10, where it may be adhesively bonded and/or mechanically restrained by folded over tabs 152.

Figure 11:
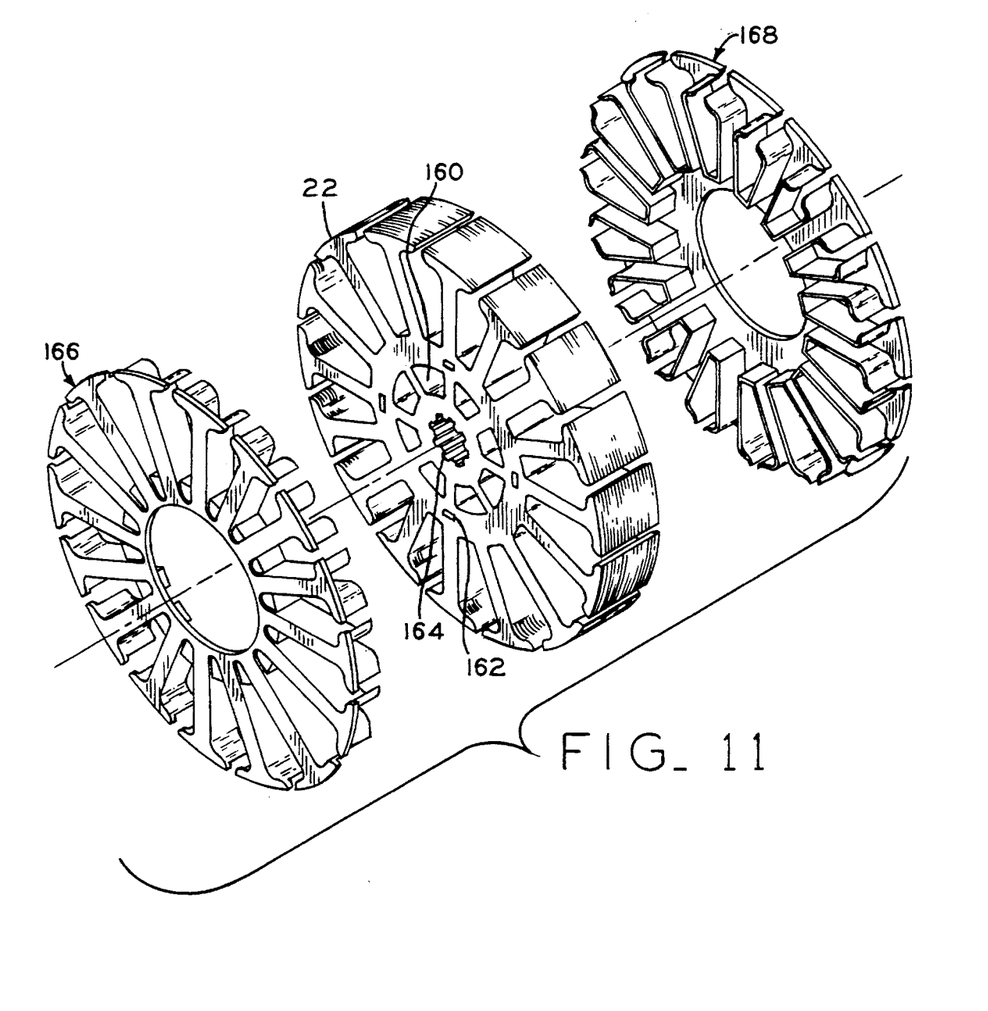
FIG. 11 is an exploded perspective view of the rotor and insulator sections showing the internal cooling air passages.

FIG. 11 is an exploded view showing the rotor 22 which is made up of a plurality of laminations in order to reduce eddy current losses in the core. An improvement in the present rotor is the utilization of air cooling passages 160 which serve to reduce the resistance to airflow around and through the rotor. This reduced resistance serves to increase the amount of flow past the commutator brush assembly thereby further promoting internal cooling of the fan motor.

Detent and protrusion 162 are stamped into each of the laminations such that on one side there is a detent and on the other side a corresponding protrusion. When the laminations are assembled together, the interlocking of detents and protrusions of adjacent laminations aid in maintaining a mechanical integrity between the plates and/or they may be epoxy bonded together.

A further improvement in terms of a cost reduction is the provision of a fluted central aperture 164 which, in a preferred embodiment, permits press fitting of the rotor on the output shaft 12 without the necessity of expensive heating of laminations and/or chilling of the shaft in the conventional interference fit assembly method. It is noted that the flutings do not generally correspond to the ribs which may be provided on the output shaft where it fits through the aperture 164, so there is a genuine interference fit rather than merely a splined interconnection.

Nylon insulators 166 and 168 sandwich the laminations of the rotor and serve as an additional defense against electrical shorting between coil windings on the armature and the laminated metal armature core itself. In prior art armatures which rely solely upon the insulation on the coil wires to prevent shorting, there is a need to very carefully finish the laminations so that the edges do not have burrs or flashing which could penetrate the thin insulator on the coil wire. The positioning of nylon insulators 166 and 168 around the laminations eliminates the need for treatment of the laminations to eliminate such protrusions. Thus, the use of the nylon insulators, while adding two additional components, serves to reduce the amount of time necessary to construct an acceptable laminated core for an armature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multiple pole, multiple brush permanent magnet direct current electric motor having multiple operating speeds, said motor comprising:

a rotor and commutator mounted for rotation, said rotor including a plurality of connected drive coils, each connection between drive coils connected to an element of said commutator;

2n brushes, where n is equal to a positive integer greater than one, in equally spaced alternating polarity around the commutator, for making electrical contact with said commutator elements; and means for selectively connecting direct current power to all of said brushes for full speed operation and to less than all of said brushes for less than full speed operation.

2. A multiple pole, multiple brush permanent magnet direct current electric motor according to claim 1, where n is two and there are two positive brushes and two negative brushes and said brushes are spaced at 90° intervals around the commutator.

3. A multiple pole, multiple brush permanent magnet direct current electric motor according to claim 2, wherein for said less than full speed operation, one of said brushes is disconnected from a respective terminal.

4. A multiple pole, multiple brush permanent magnet direct current electric motor according to claim 2, wherein for said less than full speed operation, two adjacent brushes are disconnected from respective terminals.

5. A multiple pole, multiple brush permanent magnet direct current electric motor according to claim 2, wherein there are three speeds of operation, for full speed operation, all brushes are connected to respective terminals, for medium speed operation, one of said brushes is disconnected from a respective terminal and for slow speed operation, two adjacent brushes are disconnected from respective terminals.

6. A multiple pole, multiple brush permanent magnet direct current electric motor according to claim 2 wherein selective connection of brushes determines full speed or less than full speed operation, further including at least one diode connected between at least one pair of opposing brushes of the same polarity, said diode comprising a means for permitting current flow through both of the pair of opposing brushes when one of the pair of opposing brushes is connected to a respective direct current terminal and for preventing flow through said one of the pair of opposing brushes when the other of the pair of opposing brushes is connected to said respective direct current terminal.

7. A multiple pole, multiple brush permanent magnet direct current electric motor according to claim 2, wherein selective connection of brushes determines full speed or less than full speed operation, further including at least one diode connected between one pair of opposing brushes, such that when the respective direct current terminal is connected to one end of said at least one diode, current passes directly to the associated brush and through the at least one diode to the opposing brush, and when the respective direct current terminal is connected to the other end of said at least one diode, current passes directly to the associated brush but is blocked by said at least one diode from passing to the opposing brush.

8. A multiple pole, multiple brush permanent magnet direct current electric motor according to claim 2, wherein selective connection of brushes determines full speed or less than full speed operation, wherein two opposing positive brushes and two opposing negative brushes are identified as brushes A, C, B & D, respectively, further including one positive brush diode connected between opposing brushes A & C, and one negative brush diode connected between opposing brushes B & D, where a negative direct current terminal applied to brush D will permit current flow through the negative brush diode to brush B, but a negative direct current terminal applied to brush B will not permit current flow through the negative brush diode to brush D, and a positive direct current brush applied to terminal A will permit current flow from the commutator through brush C and said positive brush diode to the positive direct current terminal but will not permit current flow from brush A through the positive brush diode when the positive direct current terminal is connected to brush C.

9. A multiple pole, multiple brush permanent magnet direct current electric motor having multiple operating speeds, said motor comprising:
   a rotor and commutator mounted for rotation, said rotor including a plurality of connected drive coils, each connection between drive coils connected to an element of said commutator;
   2n brushes, where n is equal to a positive integer greater than one, in equally spaced alternating polarity around the commutator, for making electrical contact with said commutator elements; and
   a connector selectively connecting direct current power to all of said brushes for full speed operation and to less than all of said brushes for less than full speed operation, where, for full speed operation, n brushes are connected to a negative direct current terminal and n brushes are connected to a positive direct current terminal and, for less than full speed operation, at least one of said brushes is disconnected from its respective direct current terminal.

10. A multiple pole, multiple brush permanent magnet direct current electric motor having multiple operating speeds, said motor comprising:
   a rotor and commutator mounted for rotation, said rotor including a plurality of connected drive coils, each connection between drive coils connected to an element of said commutator;
   2n brushes, where n is equal to a positive integer greater than one, in equally spaced alternating polarity around the commutator, for making electrical contact with said commutator elements;
   a connector for selectively connecting direct current power to all of said brushes for full speed operation and to less than all of said brushes for less than full speed operation, where n is two and there are two positive brushes and two negative brushes and said brushes are spaced at 90° intervals around the commutator, wherein selective connection of brushes determines full speed or less than full speed operation; and
   at least one diode connected between one pair of opposing brushes, such that when the respective direct current terminal is connected to one end of said at least one diode, current passes directly to the associated brush and through the at least one diode to the opposing brush, and when the respective direct current terminal is connected to the other end of said at least one diode, current passes directly to the associated brush but is blocked by said at least one diode from passing to the opposing brush.

11. A multiple pole, multiple brush permanent magnet direct current electric motor having multiple operating speeds, said motor comprising:
   a rotor and commutator mounted for rotation, said rotor including a plurality of connected drive coils, each connection between drive coils connected to an element of said commutator;
   2n brushes, where n is equal to a positive integer greater than one, in equally spaced alternating polarity around the commutator, for making electrical contact with said commutator elements;
   a connector for selectively connecting direct current power to all of said brushes for full speed operation and to less than all of said brushes for less than full speed operation, where n is two and there are two positive brushes and two negative brushes and said brushes are spaced at 90° intervals around the commutator, wherein selective connection of brushes determines full speed or less than full speed operation, wherein two opposing positive brushes and two opposing negative brushes are identified as brushes A, C, B & D, respectively; and
   one positive brush diode connected between opposing brushes A & C, and one negative brush diode connected between opposing brushes B & D, where a negative direct current terminal applied to brush D will permit current flow through the negative brush diode to brush B, but a negative direct current terminal applied to brush B will not permit current flow through the negative brush diode to brush D, and a positive direct current terminal applied to brush A will permit current flow from the commutator through brush C and said positive brush diode to the positive direct current terminal but will not permit current flow from brush A through the positive brush diode when the positive direct current terminal is connected to brush C.

* * * * *

UNITED STATES PATENT AND TRADEMARK OFFICE
CERTIFICATE OF CORRECTION

PATENT NO.    : 5,602,957
DATED         : February 11, 1997
INVENTOR(S)   : WILLE et al.

It is certified that error appears in the above-identified patent and that said letters patent is hereby corrected as shown below:

Column 8, line 35, after "Multi-Speed" insert --Operation--.

Claim 8, Column 13, line 41, delete "brush applied to terminal" and insert --terminal applied to brush-- therefor.

Signed and Sealed this

Tenth Day of March, 1998

Attest:

BRUCE LEHMAN

*Attesting Officer*    *Commissioner of Patents and Trademarks*